(12) United States Patent
Yamashita et al.

(10) Patent No.: US 8,609,009 B2
(45) Date of Patent: Dec. 17, 2013

(54) METHOD OF PRODUCING A MICROPRODUCT

(75) Inventors: Kazuyuki Yamashita, Toyama (JP); Takashi Onaga, Toyama (JP); Satoshi Fujiki, Toyama (JP); Hideki Morimoto, Toyama (JP); Tutomu Obata, Toyama (JP); Masayasu Suzuki, Toyama (JP)

(73) Assignees: Richell Co., Ltd. (JP); Toyama Prefecture (JP); National University Corporation Toyama University (JP)

( * ) Notice: Subject to any disclaimer, the term of this patent is extended or adjusted under 35 U.S.C. 154(b) by 996 days.

(21) Appl. No.: 12/694,462

(22) Filed: Jan. 27, 2010

(65) Prior Publication Data
US 2010/0123273 A1  May 20, 2010

Related U.S. Application Data

(63) Continuation of application No. 11/272,525, filed on Nov. 10, 2005, now abandoned, which is a continuation of application No. PCT/JP2004/018877, filed on Dec. 17, 2004.

(30) Foreign Application Priority Data

Dec. 19, 2003  (JP) ................................ 2003-423846
Sep. 15, 2004  (JP) ................................ 2004-268136

(51) Int. Cl.
*B29C 45/00* (2006.01)
(52) U.S. Cl.
USPC ........................................................ 264/328.1
(58) Field of Classification Search
USPC ........................................................ 264/328.1
See application file for complete search history.

(56) References Cited

U.S. PATENT DOCUMENTS

| 5,212,219 A | 5/1993 | Griffin |
| 5,412,024 A | 5/1995 | Okada et al. |
| 5,902,858 A | 5/1999 | Okura et al. |

(Continued)

FOREIGN PATENT DOCUMENTS

| GB | 2 211 111 A | 6/1989 |
| JP | 53-35584 | 9/1951 |

(Continued)

OTHER PUBLICATIONS

International Search Report of International Application No. PCT/JP2004/018877 filed Dec. 17, 2004.

*Primary Examiner* — Jill Heitbrink
(74) *Attorney, Agent, or Firm* — Harness, Dickey & Pierce, P.L.C.

(57) ABSTRACT

A method of producing a microproduct comprises: providing a resin composition including 30 to 90 wt % of a polypropylene-based resin and 10 to 70 wt % of a hydrogenated derivative of a block copolymer shown by "X-Y" (X represents a polymer block immiscible with the polypropylene-based resin, Y represents an elastomeric polymer block of a conjugated diene that's miscible with the polypropylene-based resin after hydrogenation); attaching a silicon stamper to a mold cavity of an injection molding machine, the silicon stamper having micromachined features formed by etching the surface of a silicon plate; and precisely transferring the micromachined features of the silicon stamper to the resin composition by injecting the resin composition into the mold cavity, a resulting molded surface having recesses and/or protrusions that are 0.3 to 200 μm deep or tall and 0.3 to 100 μm wide.

4 Claims, 14 Drawing Sheets

MICROWELL

(56) References Cited

U.S. PATENT DOCUMENTS

| | | |
|---|---|---|
| 6,284,113 B1 | 9/2001 | Byornson et al. |
| 6,331,266 B1 | 12/2001 | Powell et al. |
| 6,365,689 B1 | 4/2002 | Ushioda et al. |
| 6,409,971 B1 | 6/2002 | Wilkinson et al. |
| 6,844,055 B1 | 1/2005 | Grinshpun et al. |
| 7,052,268 B2 | 5/2006 | Powell et al. |
| 7,112,443 B2 | 9/2006 | Hajduk et al. |
| 7,279,136 B2 | 10/2007 | Takeuchi et al. |
| 7,300,612 B2 | 11/2007 | Grinshpun et al. |
| 7,435,381 B2 | 10/2008 | Pugia et al. |
| 7,524,455 B2 | 4/2009 | Potyrailo et al. |
| 7,897,245 B2 * | 3/2011 | Yamashita et al. ............ 428/167 |
| 2004/0029998 A1 | 2/2004 | Tomita et al. |
| 2004/0217503 A1 | 11/2004 | Grinshpun et al. |
| 2005/0065239 A1 | 3/2005 | Code et al. |
| 2006/0276582 A1 | 12/2006 | Mochizuki et al. |
| 2007/0088113 A1 | 4/2007 | Suzuki et al. |
| 2008/0011107 A1 | 1/2008 | Leventhal et al. |
| 2008/0299397 A1 | 12/2008 | Kenens et al. |

FOREIGN PATENT DOCUMENTS

| | | |
|---|---|---|
| JP | 48-44138 | 6/1973 |
| JP | 01-143647 | 6/1989 |
| JP | 02-151410 | 6/1990 |
| JP | 9-165482 | 6/1997 |
| JP | 2000-95878 | 4/2000 |
| JP | 2000-178319 | 6/2000 |
| JP | 2002-302658 | 10/2002 |
| JP | 2003-220330 | 8/2003 |
| JP | 2004-189798 | 7/2004 |
| JP | 2004-212048 | 7/2004 |
| JP | 2004-290968 | 10/2004 |

* cited by examiner

FIG.1

| Test No. | Chip specification | | | | | Amount (%) | | | Transfer properties | Moldability |
|---|---|---|---|---|---|---|---|---|---|---|
| | Hole diameter (μm) | Depth (μm) | Pitch (μm) | Number of holes | Thickness (mm) | Base resin | Hydrogenated derivative | | | |
| 1 | 10 | 13 | 25 | 500,000 | 1 | h-PP | 0 | | C | A |
| 2 | 10 | 13 | 25 | 500,000 | 1 | h-PP | A: 30 | | C | A |
| 3 | 10 | 13 | 25 | 500,000 | 1 | h-PP | A: 40 | | A | A |
| 4 | 10 | 13 | 25 | 500,000 | 1 | h-PP | A: 50 | | A | A |

FIG.2

| Test No. | Chip specification | | | | | Amount (%) | | | Transfer properties | Moldability |
|---|---|---|---|---|---|---|---|---|---|---|
| | Hole diameter (μm) | Depth (μm) | Pitch (μm) | Number of holes | Thickness (mm) | Base resin | Hydrogenated derivative | | | |
| 5 | 10 | 13 | 25 | 500,000 | 1 | r-PP | 0 | | C | A |
| 6 | 10 | 13 | 25 | 500,000 | 1 | r-PP | A: 5 | | C | A |
| 7 | 10 | 13 | 25 | 500,000 | 1 | r-PP | A: 10 | | B | A |
| 8 | 10 | 13 | 25 | 500,000 | 1 | r-PP | A: 20 | | A | A |
| 9 | 10 | 13 | 25 | 500,000 | 1 | r-PP | A: 30 | | A | A |
| 10 | 10 | 13 | 25 | 500,000 | 1 | r-PP | A: 40 | | A | A |
| 11 | 10 | 13 | 25 | 500,000 | 1 | r-PP | A: 50 | | A | A |
| 12 | 10 | 13 | 25 | 500,000 | 1 | r-PP | A: 60 | | A | A |
| 13 | 10 | 13 | 25 | 500,000 | 1 | r-PP | A: 70 | | A | A |
| 14 | 10 | 13 | 25 | 500,000 | 1 | r-PP | A: 80 | | A | C |
| 15 | 10 | 13 | 25 | 500,000 | 1 | r-PP | B: 40 | | A | A |
| 16 | 10 | 13 | 25 | 500,000 | 1 | r-PP | C: 40 | | A | C |
| 17 | 10 | 13 | 25 | 500,000 | 1 | r-PP | D: 5 | | C | C |
| 18 | 10 | 13 | 25 | 500,000 | 1 | r-PP | D: 10 | | C | C |
| 19 | 10 | 13 | 25 | 500,000 | 1 | r-PP | D: 20 | | C | C |
| 20 | 10 | 13 | 25 | 500,000 | 1 | r-PP | D: 30 | | B | A |
| 21 | 10 | 13 | 25 | 500,000 | 1 | r-PP | D: 40 | | A | A |
| 22 | 10 | 13 | 15 | 250,000 | 1 | r-PP | A: 0 | | C | A |
| 23 | 10 | 13 | 15 | 250,000 | 1 | r-PP | A: 50 | | A | A |

MICROWELL

WELD LINE

WELD LINE

FIG.18

| Material \ Sample No. | 1 | 2 | 3 | 4 | 5 | 6 | 7 | 8 | 9 | 10 | 11 | 12 | 13 | 14 | 15 | 16 | 17 | 18 (Amount %) |
|---|---|---|---|---|---|---|---|---|---|---|---|---|---|---|---|---|---|---|
| Homopolypropylene | 100 | - | 95 | - | 90 | - | 80 | - | 70 | - | 60 | - | 50 | - | 40 | - | 30 | - |
| Hydrogenated derivative | 0 | - | 5 | - | 10 | - | 20 | - | 30 | - | 40 | - | 50 | - | 60 | - | 70 | - |
| Injection moldability | C | - | B | - | B | - | B | - | A | - | AA | - | A | - | B | - | B | - |
| Random copolymer | - | 100 | - | 95 | - | 90 | - | 80 | - | 70 | - | 60 | - | 50 | - | 40 | - | 30 |
| Hydrogenated derivative | - | 0 | - | 5 | - | 10 | - | 20 | - | 30 | - | 40 | - | 50 | - | 60 | - | 70 |
| Injection moldability | - | C | - | B | - | A | - | AA | - | A | - | B | - | B | - | B | - | B |

METHOD OF PRODUCING A MICROPRODUCT

CROSS REFERENCE TO RELATED APPLICATION

This application is a continuation of U.S. patent application Ser. No. 11/272,525 filed on Nov. 10, 2005 which is a continuation of International Patent Application No. PCT/JP2004/018877, having an international filing date of Dec. 17, 2004, which designated the United States, which claims priority to Japanese Patent Application No. 2003-423846 filed on Dec. 19, 2003 and Japanese Patent Application No. 2004-268136 filed on Sep. 15, 2004 which are all incorporated herein by reference in their entireties.

BACKGROUND OF THE INVENTION

The present invention relates to a microproduct in the fields of chemistry, biochemistry, biotechnology, and biology (hereinafter called "microproduct"), such as a micromechanical switching element, a microoptical product, a microfluid, a microchemical reactor functional element, a capillary model of a blood fluidity measuring device, a microbioreactor, a microwell array chip, a microinjector, or a micro micro resin pipette tip, and its applied product. More particularly, the invention relates to a resin composition suitable for producing the microproduct by injection molding.

A microproduct requiring minute recesses, such as a microwell array chip, is generally made of a silicon single crystal. A minute protrusion/recess pattern is formed by using an etching method.

However, this method suffers from high material cost and long production time.

Moreover, defective products are produced at a high rate so that the testing accuracy may be decreased due to variation in the minute protrusion/recess pattern.

Furthermore, since the microproduct is expensive, it is necessary to wash the microproduct after the test and reuse the washed microproduct. As a result, the testing accuracy may be decreased due to insufficient washing.

In cell-level inspection and analysis, a pipette tip is necessary as a capillary for adsorbing a lymphocyte (diameter: about 10 μm) placed in a specific microwell (microwell diameter: about 10 μm, microwell pitch: 20 μm) of a microwell array chip as shown in a microscope photograph of FIG. 3, and injecting the lymphocyte into another container.

The volume of one lymphocyte is about one picoliter (pl). As the capillary (pipette tip) used for cells having such a minute volume and small diameter or a test solution, a capillary having a volume of several tens of picoliters is necessary. A related-art capillary is described below.

A glass capillary has been used as a nozzle having an inner diameter of about 15 μm which can sample one cell.

However, the glass capillary poses the following problems.

The glass capillary lacks rigidity. This does not pose a problem in manual cell micromanipulation. However, when mechanically sampling a cell at a high speed, the capillary (particularly the nozzle end) swings and does not stand still, so that precise cell sampling work cannot be performed.

Since the glass capillary has insufficient strength, the glass capillary breaks when contacting (colliding with) a cell chip (e.g. microwell array chip) irrespective of the material for the cell chip.

When installing a cell sampling nozzle in a machine and automatically and continuously sampling cells, the hole of the nozzle must be positioned at the center of the nozzle with high accuracy.

However, it is very difficult to shape the glass capillary with high accuracy.

A cell sampling nozzle such as a pipette tip which handles a human biological substance must be carefully disposed of as a medical waste.

However, the glass capillary easily breaks, and the broken capillary is dangerous.

An artificial ruby nozzle has been used as a nozzle having an inner diameter of about 15 μm which can sample one cell.

However, the artificial ruby nozzle poses the following problems.

The artificial ruby nozzle requires manual surface finish work by a skilled worker. Therefore, the artificial ruby nozzle is expensive (50,000 to 100,000 Yen per product) and cannot be mass-produced.

A cell sampling nozzle handles a human biological substance. In order to prevent biohazard or contamination of the sample, it is desirable to supply a sterilized nozzle under aseptic conditions and change the nozzle for each sample. Therefore, it is necessary to develop a nozzle which can be mass-produced at low cost.

A cell sampling nozzle which handles a human biological substance must be carefully disposed of as a medical waste.

The artificial ruby nozzle cannot be disposed of due to high strength, and it is highly dangerous due to the thin tip.

Therefore, if a microproduct can be produced by injection molding, microproducts having specific quality can be mass-produced in a short time, whereby production cost can be reduced. As a result, the microproduct can be disposed of after use so that a decrease in testing accuracy due to insufficient washing does not occur.

Various attempts have been made to utilize the advantage of injection molding.

In related-art technology, when producing a microproduct requiring minute recesses and protrusions, a stamper having a minute protrusion/recess pattern is attached to a mold cavity, and a molten resin is injected at a high temperature and a high pressure. The injected resin is then solidified by cooling and removed. The micromachined features formed on the stamper are transferred to the surface of the resin plate removed.

The stamper used in the related-art technology is a silicon master or an electroformed nickel master. The resin injected is a general thermoplastic resin, i.e. polypropylene, polyethylene, polystyrene, acrylonitrile-styrene copolymer, or high-fluidity polycarbonate.

In order to precisely transfer the deepest portion of the micromachined features of the stamper, a resin having excellent flow properties is generally used, and the temperature and the pressure during injection are set at very high values.

However, the smallest protrusion/recess of the product shape which can be transferred by injection molding is 0.2 to 0.3 mm. It is necessary to use an MI20 (g/10 min) material and set the injection pressure at 200 to 250 MPa.

JP-UM-A-53-35584 discloses a thin tube having an inner diameter of 0.60 to 2.00 mm. At present, a product having an inner diameter of 0.20 mm can be injected.

JP-A-1-143647 discloses a micropipette. However, since the micropipette disclosed in JP-A-1-143647 is made of glass, this micropipette suffers from the above-described technical problems.

Injection molding can provide a product having a specific quality at low cost. However, since injection molding uses a mold, a resin used must have excellent releasability and flow properties, for example.

Moreover, since an expensive silicon stamper easily breaks, if a resin can be injection molded at a low injection pressure, the high mass production capability of injection molding can be utilized by preventing breakage of the silicon stamper.

On the other hand, an electroformed nickel master does not break. However, since the production process is complicated and requires a long time, production cost is very high. This increases cost of the resulting molded product.

SUMMARY

A first aspect of the invention relates to a microproduct comprising a resin composition including a polypropylene-based resin and a hydrogenated derivative of a block copolymer shown by the general formula "X-Y" (X represents a polymer block immiscible with the polypropylene-based resin, and Y represents an elastomeric polymer block of a conjugated diene), and having micromachined features of a stamper precisely transferred by injection molding so that a molded surface has a plurality of recesses and/or protrusions with a depth of the recess or a length of the protrusion being 0.3 to 200 μm and a width of an opening of the recess, a width of the protrusion, or a circumscribed or inscribed circle diameter of the recess or the protrusion being 0.3 to 100 μm.

A second aspect of the invention relates to a medical microproduct comprising the above microproduct.

A third aspect of the invention relates to a microwell array chip comprising the above microproduct.

A fourth aspect of the invention relates to a microwell position detection plate comprising the above microwell array chip and a transparent plate, a back surface of the microwell array chip being bonded to a front surface of the transparent plate by using an adhesive.

A fifth aspect of the invention relates to a micro resin pipette tip comprising the above microproduct, and capable of sampling or dispensing a biological substance, an organic substance, or an inorganic substance.

A sixth aspect of the invention relates to a method of producing a microproduct comprising: providing a resin composition including 30 to 90 wt % of a polypropylene-based resin and 10 to 70 wt % of a hydrogenated derivative of a block copolymer shown by the general formula "X-Y" (X represents a polymer block immiscible with the polypropylene-based resin, and Y represents an elastomeric polymer block of a conjugated diene that is miscible with the polypropylene-based resin after hydrogenation); attaching a silicon stamper to a mold cavity of an injection molding machine, the silicon stamper having micromachined features formed by etching the surface of a silicon plate; and precisely transferring the micromachined features of the silicon stamper to the resin composition by injecting the resin composition into the mold cavity, a molded surface formed using the resin composition having a plurality of recesses and/or protrusions, a depth of each recess or a height of each protrusion being 0.3 to 200 μm, and a width of an opening of each recess, a width of each protrusion, or a circumscribed or inscribed circle diameter of each recess or each protrusion being 0.3 to 100 μm.

In a seventh aspect of the invention, the polymer block X of the hydrogenated derivative of the resin composition is polystyrene, and the polymer block Y before hydrogenation is polyisoprene having a 1,2-bond, a 3,4-bond, and a 1,4-bond, or polyisoprene having a 1,4-bond.

In an eighth aspect of the invention, the polymer block X of the hydrogenated derivative of the resin composition is polystyrene, and the polymer block Y before hydrogenation is polybutadiene having at least one of a 1,2-bond and a 1,4-bond.

In a ninth aspect of the invention, the resin composition includes a nucleating agent for the polypropylene-based resin.

BRIEF DESCRIPTION OF THE SEVERAL VIEWS OF THE DRAWING

FIG. 1 shows testing conditions and results of Example 1.
FIG. 2 shows testing conditions and results of Example 2.
FIG. 18 shows injection moldability evaluation results.

DETAILED DESCRIPTION OF THE EMBODIMENT

Figure 3:
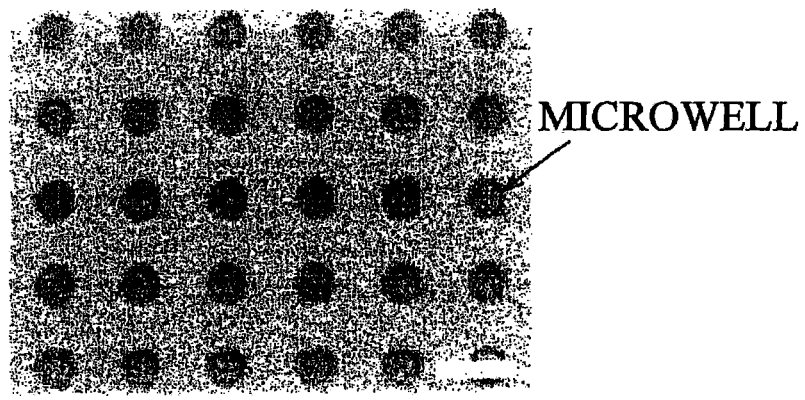
FIG. 3 is a micrograph of excellent transfer properties.

The invention may provide a resin composition which can be molded at a temperature and a pressure equal to or lower than those of general injection molding, enables precise transfer of micromachined features (minute protrusion/recess pattern) of a stamper, and can produce a microproduct having a minute opening, such as a micro resin pipette tip which samples or dispenses a minute substance or a minute volume, by injection molding.

A microproduct according to one embodiment of the invention includes a resin composition having a polypropylene-based resin and a hydrogenated derivative of a block copolymer shown by the general formula "X-Y" (X represents a polymer block immiscible with the polypropylene-based resin, and Y represents an elastomeric polymer block of a conjugated diene), and has excellent transfer properties.

The term "excellent transfer properties" used herein mean that the micromachined protrusion/recess shape of the stamper can be precisely transferred to a microwell array chip or the like by injection molding, and the protrusion/recess shape of the stamper or a mold shape can be precisely transferred to a product having minute openings such as a pipette tip.

The polymer block X is a polymer block immiscible with the polypropylene-based resin, and the polymer block Y is an elastomeric polymer block of a conjugated diene. As the polypropylene-based resin, a homopolymer or a random copolymer containing an a-olefin such as ethylene, butene-1, or hexene-1 may be used.

As examples of the polymer block X, a polymer produced by polymerizing vinyl aromatic monomers (e.g. styrene), ethylene, methacrylate (e.g. methyl methacrylate), or the like can be given.

The hydrogenated derivative of the block copolymer shown by the general formula "X-Y" includes copolymers shown by $(X-Y)_n$ (n=1 to 5), X-Y-X, Y-X-Y, and the like.

As examples of the polymer block X of the hydrogenated derivative, a polystyrene polymer block and a polyolefin polymer block can be given. As examples of the polystyrene polymer block, a polymer block including at least one vinyl aromatic compound selected from styrene, α-methylstyrene, o-methylstyrene, m-methylstyrene, p-methylstyrene, 2,4-dimethylstyrene, vinylnaphthalene, and vinylanthracene as the monomer unit can be given.

As an example of the polyolefin polymer block, a copolymer of ethylene and an α-olefin having 3 to 10 carbon atoms can be given.

A nonconjugated diene may be polymerized in the polymer block.

As examples of the olefin, propylene, 1-butene, 3-methyl-1-butene, 1-pentene, 4-methyl-1-pentene, 1-hexene, 1-pentene, 1-octene, 1-decene, and the like can be given.

As examples of the nonconjugated diene, 1,4-hexadiene, 5-methyl-1,5-hexadiene, 1,4-octadiene, cyclohexadiene, cyclooctadiene, cyclopentadiene, 5-ethylidene-2-norbornene, 5-butylidene-2-norbornene, 2-isopropenyl-5-norbornene, and the like can be given.

As specific examples of the copolymer, an ethylene-propylene copolymer, an ethylene-1-butene copolymer, an ethylene-1-octene copolymer, an ethylene-propylene-1,4-hexadiene copolymer, an ethylene-propylene-ethylidene-2-norbornene copolymer, and the like can be given.

As examples of the polymer block Y before hydrogenation, polybutadiene including at least one group selected from the group consisting of a 2-butene-1,4-diyl group and a vinylethylene group as the monomer unit, and polyisoprene including at least one group selected from the group consisting of a 2-methyl-2-butene-1,4-diyl group, an isopropenylethylene group, and a 1-methyl-1-vinylethylene group as the monomer unit can be given.

As another example of the polymer block Y before hydrogenation, an isoprene-butadiene copolymer including an isoprene unit and a butadiene unit as the major monomer units, the isoprene unit being at least one group selected from the group consisting of a 2-methyl-2-butene-1,4-diyl group, an isopropenylethylene group, and a 1-methyl-1-vinylethylene group, and the butadiene unit being a 2-butene-1,4-diyl group and/or a vinylethylene group, can be given.

The arrangement of the butadiene unit and the isoprene unit may be a random arrangement, a block arrangement, or a tapered block arrangement.

As still another example of the polymer block Y before hydrogenation, a vinyl aromatic compound-butadiene copolymer including a vinyl aromatic compound unit and a butadiene unit as the major monomer units, the vinyl aromatic compound unit being at least one monomer unit selected from styrene, α-methylstyrene, o-methylstyrene, m-methylstyrene, p-methylstyrene, 2,4-dimethylstyrene, vinylnaphthalene, and vinylanthracene, and the butadiene unit being a 2-butene-1,4-diyl group and/or a vinylethylene group, can be given. The arrangement of the vinyl aromatic compound unit and the butadiene unit may be a random arrangement, a block arrangement, or a tapered block arrangement.

The hydrogenation state of the polymer block Y may be partial hydrogenation or complete hydrogenation.

In the microproduct according to this embodiment, if the polymer block X of the hydrogenated derivative of the resin composition is polystyrene and the polymer block Y before hydrogenation is 1,2-polyisoprene, 3,4-polyisoprene, and/or 1,4-polyisoprene, the raw materials are easily available.

Since the styrene component has poor miscibility with the polypropylene-based resin or the like, a longer period of time is required to mix the styrene component with polypropylene as the amount of styrene component is increased. Therefore, when using a hydrogenated derivative containing a large amount of styrene component, it is preferable to sufficiently mix the styrene component and polypropylene in advance to prepare a masterbatch.

With the microproduct according to this embodiment, if the polymer block X of the hydrogenated derivative of the resin composition may be polystyrene, and the polymer block Y before hydrogenation is at least one of 1,2-polybutadiene and 1,4-polybutadiene, the raw materials are easily available.

The miscibility is described below.

When the polymer block X is immiscible with the polypropylene-based resin, the polymer block X forms microdomains having a size approximately equal to the radius of gyration. The microdomains may be confirmed by transmission electron microscope observation or measurement and analysis of the scattering pattern of isolated domains by small-angle X-ray scattering.

In this case, the glass transition temperature of the polymer block X is changed to only a small extent by mixing with the polypropylene-based resin. This may be confirmed by differential scanning calorimetry (DSC) or dynamic viscoelasticity measurement.

When the polymer block Y is miscible with the polypropylene-based resin, the glass transition temperature of the polymer block Y and the glass transition temperature of polypropylene are changed so that a new glass transition temperature appears between these glass transition temperatures.

The change in the glass transition temperature may be confirmed by dynamic viscoelasticity measurement or the like. If the polypropylene-based resin is immiscible with the polymer blocks of the X-Y block copolymer, the components are separated into an X-Y block copolymer phase (which forms a microdomain structure of the polymer block X phase and the polymer block Y phase) and a polypropylene-based resin phase. If the polypropylene-based resin is miscible with the polymer block Y, the interval between the microdomains of the polymer block X is increased, or microdomains of the polymer block X are uniformly dispersed in the polypropylene-based resin.

The morphological change when the polymer block Y is miscible with the polypropylene-based resin may be confirmed by observing the positions of the microdomains by using a transmission electron microscope or analyzing the distance between the microdomains by small-angle X-ray scattering.

In the microproduct according to this embodiment, a nucleating agent for the polypropylene-based resin may be added to the resin composition. As the nucleating agent, a metal salt type nucleating agent (metal phosphate or metal carboxylate)

which improves properties and transparency by a nucleation effect and a benzylidene sorbitol type nucleating agent which provides transparency by network formation can be given.

The benzylidene sorbitol type nucleating agent is a condensate of benzaldehyde and sorbitol, and contains a hydroxyl group.

Since a random copolymer generally has transparency higher than that of a homopolymer, it is preferable to add the benzylidene sorbitol type nucleating agent to a random copolymer when high transparency is required.

This enables a highly transparent microproduct to be obtained.

In the microproduct obtained by using the resin composition according to this embodiment, the micromachined features of a stamper are precisely transferred so that the molded surface has a plurality of recesses and/or protrusions with the depth of the recess or the length of the protrusion being 0.3 to 200 μm and the width of the opening of the recess, the width of the protrusion, or the circumscribed or inscribed circle diameter of the recess or the protrusion being 0.3 to 100 μm.

The circumscribed or inscribed circle used herein refers to the maximum inscribed circle which contacts the inner wall of the recess at at least three points or the minimum circumscribed circle which contacts the outer wall of the protrusion at at least three points.

A microwell can be given as an example of the recess, and a microneedle can be given as an example of the protrusion.

When molding a microproduct using a silicon stamper, since the resin composition exhibits excellent transfer properties, the microproduct can be molded under injection conditions equal to or less stringent than usual polypropylene-based resin injection conditions. Therefore, since the silicon stamper is not damaged, the silicon stamper can be used for injection molding for a long time.

A medical microproduct according to one embodiment of the invention is obtained by using the microproduct. Micromachined features of a stamper are precisely transferred to the medical microproduct by injection molding so that the molded surface has a plurality of recesses and/or protrusions with the depth of the recess or the length of the protrusion being 0.3 to 200 μm and the width of the opening of the recess, the width of the protrusion, or the circumscribed or inscribed circle diameter of the recess or the protrusion being 0.3 to 100 μm.

A silicon stamper can be manufactured at low cost in a short period of time in comparison with an electroformed nickel stamper. Since the resin composition according to this embodiment exhibits excellent releasability, it is unnecessary to apply a release agent so that a release agent does not remain on the surface of the molded product. Therefore, a medical microproduct can be suitably molded.

A microwell array chip according to one embodiment of the invention is obtained by using the microproduct. A silicon stamper is attached to a mold, and micromachined features of the stamper are precisely transferred by injection molding so that the molded surface has a plurality of recesses and/or protrusions with the depth of the recess or the length of the protrusion being 0.3 to 200 μm and the width of the opening of the recess, the width of the protrusion, or the circumscribed or inscribed circle diameter of the recess or the protrusion being 0.3 to 100 μm.

A lymphocyte or the like is placed in the well of the microwell array chip. Since a release agent does not remain on the surface of the microwell array chip, the microwell array chip exhibits excellent biocompatibility.

The microwell array chip according to this embodiment may be used as a microwell position detection plate by bonding a transparent plate to the back surface of the microwell array chip using an adhesive, for example.

If a microwell position detection plate is formed by bonding the back surface of the microwell array chip to the front surface of the transparent plate by utilizing the properties in which the styrene block included in the resin composition bonds to an adhesive, particularly to a cyanoacrylate adhesive, a plate compatible with an ordinary optical reading device and enabling accurate detection of the position of each microwell can be obtained.

Since the resin composition exhibits excellent transfer properties and can be injection molded at a reduced injection pressure in a molten state during molding, the microproduct according to the embodiment of the invention may be applied to a micro resin pipette tip which can sample or dispense a biological substance, an organic substance, or an inorganic substance.

Since the injection pressure can be reduced by using the resin composition exhibiting excellent transfer properties, a pipette tip which can sample or dispense a minute or a small amount of biological substance, organic substance, or inorganic substance can be obtained.

The biological substance used herein refers to a cell, protein, nucleic acid, cellular tissue, bacterium, or the like. As an example of the cell, a lymphocyte can be given. As an example of the protein, an immunoglobulin G can be given. As an example of the nucleic acid, a DNA solution can be given. As an example of the bacterium, yeast *Saccharomyces* can be given.

The target organic substance may be glycerol or the like, and the target inorganic substance may be a phosphoric acid buffer solution or the like.

The volume of the micro resin pipette tip may be several tens of picoliters to several tens of nanoliters, and the inner diameter of the open end may be several to several tens of microns.

In this case, it is preferable that the micro resin pipette tip have a nozzle hole at the center and has a conical or pyramidal pipe shaped end.

The "pipe shape" used herein means that the end has a hollow section as a capillary, and not only includes a pipe having a circular external shape, but also includes a pipe having a miscellaneous shape.

The term "volume of several tens of picoliters to several tens of nanoliters" used herein refers to the volume of a section having a conical or pyramidal internal shape which directly contributes to sampleion or dispensing and is formed in the vicinity of the end of the pipette tip.

Therefore, the term "volume of several tens of picoliters to several tens of nanoliters" means a volume of about 10 picoliters to 90 nanoliters, since this volume is the volume of the conical or pyramidal section.

Likewise, the term "inner diameter of the open end of several to several tens of microns" means an inner diameter of about 1 to 90 μm, since the inner diameter of the end of the chip is gradually changed.

The expression "conical or pyramidal shape" is used to not only include a cone but also include a triangular or higher polygonal pyramid.

If the end has a conical or pyramidal shape, a substance can be sampled from only the target well of the microwell array shown in FIG. 3 without interfering with the adjacent wells, for example.

When the micro resin pipette tip has a nozzle hole at the center and has a conical or pyramidal pipe shaped end, if a cavity section used for injection molding is divided into four segments along the pipe center axis, the conical or pyramidal shape of the nozzle end (chip end) is precisely formed by electric discharge machining of the mold.

In order to injection mold a micro resin pipette tip, it is preferable to place a needle-shaped core in the hole-forming section to divide the outer mold. In this case, the mold is divided into at least two segments. However, if the mold is divided into two segments, it becomes difficult to electric discharge machine the minute area such as the end of the pipette tip with high dimensional accuracy.

This is because sagging occurs at the corner due to discharge metal melting between the mold and the electrode.

Therefore, electric discharge machining is facilitated by dividing the mold into a larger number of segments. However, since mold matching during molding takes time if the number of divisions is large, the number of divisions is preferably four.

The mold precision may be increased by providing a silicon stamper at the section corresponding to the end of the pipette tip.

Since the resin composition according to the embodiment of the invention includes the hydrogenated derivative having a specific composition in addition to the polypropylene-based resin, micromachined features of the stamper or the mold shape can be precisely transferred under injection conditions equal to or less stringent than usual polypropylene-based resin injection conditions, that is, at a mold temperature of 50° C., a resin temperature of 240° C., and an injection pressure of 40 to 70 MPa.

The micromachined features can be precisely transferred so that the molded surface has a plurality of recesses and/or protrusions with the depth of the recess or the length of the protrusion being 0.3 to 200 μm and the width of the opening of the recess, the width of the protrusion, or the circumscribed or inscribed circle diameter of the recess or the protrusion being 0.3 to 100 μm.

If the amount of hydrogenated derivative added to the polypropylene-based resin is large, the transfer performance does not differ between the homopolymer and the random copolymer. On the other hand, if the amount of hydrogenated derivative added to the polypropylene-based resin is small, the random copolymer exhibits higher transfer performance.

If polystyrene is used as the polymer block X of the hydrogenated derivative and 1,2-polyisoprene, 3,4-polyisoprene, and/or 1,4-polyisoprene is used as the polymer block Y before hydrogenation, or polystyrene is used as the polymer block X of the hydrogenated derivative and 1,2-polybutadiene and/or 1,4-polybutadiene is used as the polymer block Y before hydrogenation, the raw materials are easily available from the market so that an inexpensive microproduct to which the micromachined features are precisely transferred can be obtained.

Since the micro resin pipette tip according to one embodiment of the invention has a conical or pyramidal end, swinging rarely occurs even if the micro resin pipette tip is transported at a high speed, so that the micro resin pipette tip functions as a stable capillary.

While a glass capillary breaks when the glass capillary contacts a cell chip, the micro resin pipette tip according to this embodiment has such strength that the micro resin pipette tip can endure collision with a cell chip.

Moreover, an artificial ruby nozzle is too hard and is likely to damage the chip retaining cells. However, the micro resin pipette tip according to this embodiment does not damage the chip even when the micro resin pipette tip collides with the chip.

The micro resin pipette tip can be injection molded and is easily mass-produced while controlling the shape with high accuracy. Moreover, the micro resin pipette tip is easily burnt and dissolved after high-pressure thermal sterilization.

In order to prevent biohazard or contamination of recovered samples when handling a human biological substance, it is desirable to supply a sterilized pipette tip under aseptic conditions and to change the pipette tip for each sample. The micro resin pipette tip according to this embodiment, which can be mass-produced at low cost, can deal with such a demand.

In this embodiment, use of the resin composition exhibiting excellent transfer properties enables a micro resin pipette tip having a volume of several tens of picoliters to several tens of nanoliters and an inner diameter of the open end of several to several tens of microns to be mass-produced at low cost by injection molding.

Since the resin composition according to the embodiment of the invention includes a hydrogenated derivative which does not prevent crystallization of the polypropylene-based resin and is miscible with the polypropylene-based resin, the resin composition does not show a decrease in the melting point to exhibit excellent heat resistance and allow thermal sterilization.

Example 1

Effect of Addition of Hydrogenated Derivative (Elastomer) to Resin Composition Containing Homo-PP as Base Resin In Example 1 of the invention, a hydrogenated derivative was added to a polypropylene homopolymer (hereinafter called "homo-PP") as a base resin in different amounts to prepare resin compositions. A microwell array chip with a thickness of 1 mm was molded by using each resin composition, and the transfer properties and moldability of each molded product were evaluated. The mixing ratio of the homo-PP to the hydrogenated derivative was 100:0, 70:30, 60:40, and 50:50.

As the homo-PP, Mitsui Sumitomo Polypro PP for injection molding "J-105F" (manufactured by Mitsui Sumitomo Polyolefin Co., Ltd., CAS No: 9003-07-0) was used.

This homo-PP has an MFR of 8.0 g/10 min, a density of 0.91 g/cm$^3$, a tensile yield strength of 410 kg/cm, a flexural modulus of elasticity of 24300 kg/cm, and a Rockwell hardness of 116R.

As the hydrogenated derivative, (A) "Hybrar 7311S" (manufactured by Kuraray Co., Ltd., hydrogenated polystyrene-vinyl polyisoprene-polystyrene block copolymer, styrene content: 12 wt %) was used.

As a stamper attached to a mold cavity of an injection molding machine, a stamper formed by etching the surface of a silicon plate and having a minute protrusion/recess pattern, in which protrusions with a diameter of 10 μm and a height of 13 μm were formed at a pitch of 25 μm, was used.

The homo-PP and the hydrogenated derivative were mixed in advance at the above-mentioned mixing ratio. The mixture was supplied to a hopper of the injection molding machine, and molded at a mold temperature of 50° C., a cylinder temperature of 240° C., and an injection pressure of 40 MPa.

The test results are shown in FIG. 1.

In FIG. 1 (table), "h-PP" indicates that the homo-PP was used as the base material. A minute protrusion/recess pattern reverse of that of the stamper was transferred to the surface of the microwell array chip as the molded product. The molded surface (transfer surface) was photographed by using a digital HD microscope "VH-7000" (manufactured by Keyence Corporation), and the transfer properties were visually evaluated according to the following criteria.

Figure 4:
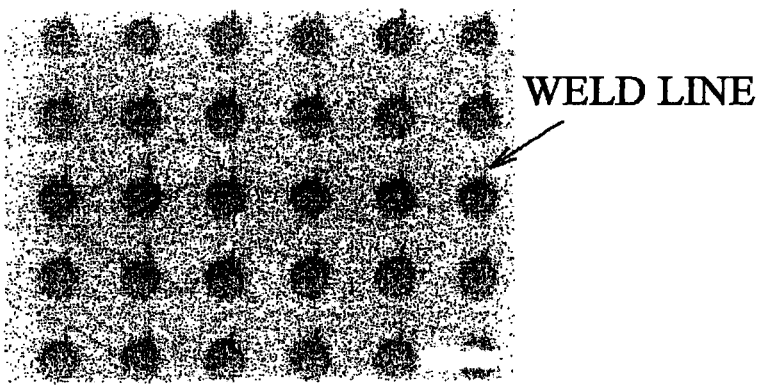
FIG. 4 is a photograph of a non-continuous weld line occurring between wells.
Figure 5:
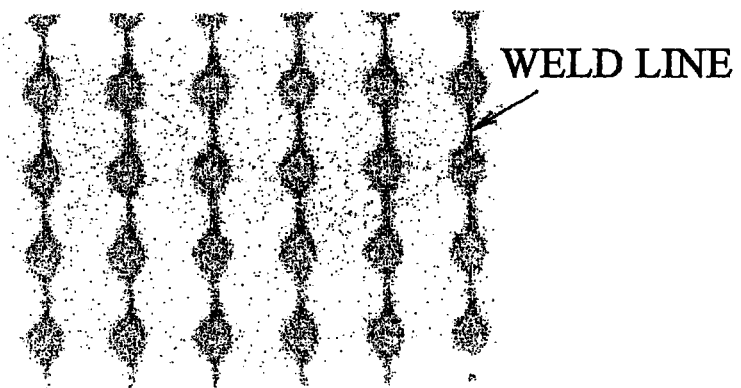
FIG. 5 is a photograph of a continuous weld line occurring between wells.

A molded product in which no weld line was observed (see FIG. 3) was evaluated as "A", a molded product in which weld lines were observed but microwells were not connected (see FIG. 4) was evaluated as "B", and a molded product in which weld lines were observed and microwells were connected (see FIG. 5) was evaluated as "C".

Figure 6:
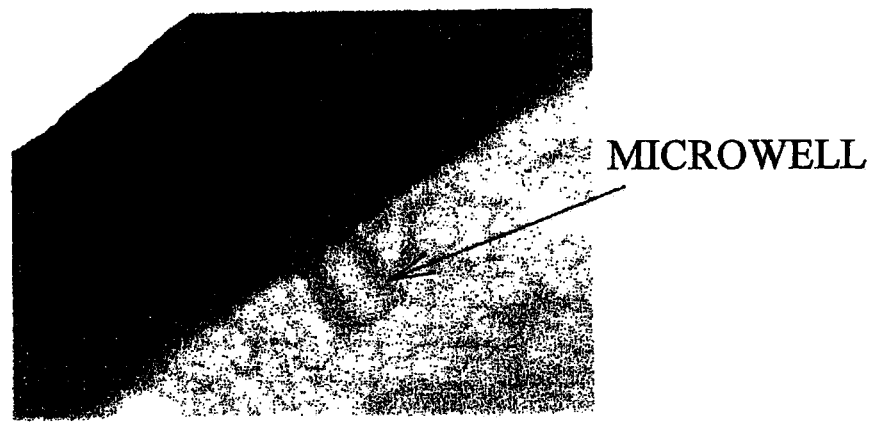
FIG. 6 is an enlarged cross-sectional photograph of a microwell array chip.

FIG. 6 shows an enlarged cross-sectional photograph of the microwell as a reference. The microwell has a diameter of 10 μm and a depth of 13 μm.

The moldability was evaluated as follows. A molded product which exhibited excellent releasability from the silicon stamper to allow automatic and continuous production was evaluated as "A", a molded product in which the resin remained on the stamper due to poor releasability from the silicon stamper to prevent automatic and continuous production was evaluated as "C".

As indicated by the test number 1, excellent transfer properties could not be obtained by using only the homo-PP.

When adding the hydrogenated derivative to the homo-PP, the test number 2 showed transfer properties improved to some extent, and the test numbers 3 and 4 showed excellent transfer properties.

The test numbers 1 to 4 showed excellent releasability.

The limit of the transfer properties was investigated by using the resin composition in which the mixing ratio of the hydrogenated derivative was 50%. As a result, the recess shape could be precisely transferred without causing corner sagging up to an inscribed circle diameter of 0.3 μm and a depth of 0.3 μm.

The protrusion shape could be transferred up to a circumscribed circle diameter of 0.3 μm and a depth of 0.3 μm. However, sagging occurred at the edge to a small extent.

Example 2

Effect of Addition of Hydrogenated Derivative (Elastomer) to Resin Composition Containing Random-PP as Base Resin In Example 2 of the invention, a hydrogenated derivative was added to a polypropylene random copolymer (hereinafter called "random-PP") as a base resin in different amounts to prepare resin compositions. A microwell array chip with a thickness of 1 mm was molded by using each resin composition, and the transfer properties and moldability of each molded product were evaluated.

The mixing ratio of the random-PP to the hydrogenated derivative was set at 100:0 to 20:80.

As the random-PP, "J-3021GR" for injection molding (manufactured by Idemitsu Petrochemical Co., Ltd.) was used.

This random-PP has an MFR of 33 g/10 min, a density of 0.9 g/cm$^3$, a Young's modulus of 1000 MPa, a flexural modulus of elasticity of 1000 MPa, and a Rockwell hardness of 76R.

As the hydrogenated derivative, (A) "Hybrar 7311S" (manufactured by Kuraray Co., Ltd., hydrogenated polystyrene-vinyl polyisoprene-polystyrene block copolymer, styrene content: 12 wt %), (B) "Dynaron 1321P" (manufactured by JSR Corporation, hydrogenated polystyrene-butadiene, styrene content: 10%), (C) "Hybrar 7125" (manufactured by Kuraray Co., Ltd., hydrogenated polystyrene-vinyl polyisoprene-polystyrene block copolymer, styrene content: 20%), and (D) "HG664" (manufactured by Kuraray Co., Ltd., hydrogenated polystyrene-vinyl polyisoprene-polystyrene containing primary hydroxyl group at molecule terminal, styrene content: 30%) were used.

As the stamper attached to the mold cavity of the injection molding machine, a stamper formed by etching the surface of a silicon plate with a thickness of 1 mm to provide cylindrical protrusions with a diameter of 10 μm and a height of 13 μm at a pitch of 25 μm (test numbers 5 to 21), and a stamper formed by etching the surface of a silicon plate with a thickness of 1 mm to provide cylindrical protrusions with a diameter of 10 μm and a height of 13 μm at a pitch of 15 μm (test numbers 22 and 23) were used.

The random-PP and the hydrogenated derivative were mixed in advance at the above-mentioned mixing ratio. The mixture was supplied to a hopper of the injection molding machine, and molded at a mold temperature of 50° C., a cylinder temperature of 240° C., and an injection pressure of 40 MPa.

The test results are shown in FIG. 2.

In FIG. 2, "r-PP" indicates the random-PP.

The evaluation methods are the same as those of Example 1.

As indicated by the test number 5, excellent transfer properties could not be obtained by using only the random-PP.

The test number 6, in which the hydrogenated derivative was added to the random-PP in an amount of 5 wt %, did not show excellent transfer properties.

However, the test number 7, in which the hydrogenated derivative was added to the random-PP in an amount of 10 wt %, showed transfer properties improved to some extent. The test numbers 8 to 16 showed excellent transfer properties.

However, the test number 14 had difficulty in injection molding due to poor releasability.

The test numbers 15 and 16, in which the hydrogenated derivatives B and C were respectively added in an amount of 40 wt %, showed excellent transfer properties and moldability.

In regard to the test numbers 17 to 21 containing the hydrogenated derivative D, the transfer properties were improved to some extent when adding the hydrogenated derivative to the random-PP in an amount of 30 wt % (test number 20). The test number 21 showed excellent transfer properties.

The test numbers 17 to 19 had difficulty in injection molding due to poor releasability.

However, the test numbers 20 and 21 showed excellent releasability.

In the test numbers 22 and 23, the pitch was set at 15 μm. The transfer properties were poor when the hydrogenated derivative A was not added. However, excellent transfer properties and moldability were obtained when adding the hydrogenated derivative A in an amount of 50 wt %.

Example 3

Effect of Addition of Nucleating Agent to Resin Composition Containing Crystallized Homo-PP as Base Resin In Example 3 of the invention, a nucleating agent was added to a highly crystallized polypropylene homopolymer as a base resin in different amounts to prepare resin compositions. The resin compositions were then pelletized. A microwell array chip injection molded product with a thickness of 1 mm was obtained by using each pellet composition, and the haze value of each molded product was measured as transparency evaluation.

The nucleating agent was added to the resin composition containing 50 parts by weight of the hydrogenated derivative and 0.3 part by weight of metal soap for 100 parts by weight of the homo-PP in the range of 0 to 1.0 part by weight.

In this example, Mitsui Sumitomo Polypro PP for injection molding "J-105F" (manufactured by Mitsui Sumitomo Polyolefin Co., Ltd., CAS No: 9003-07-0) was used as the homo-PP.

This homo-PP has an MFR of 8.0 g/10 min, a density of 0.91 g/cm$^3$, a tensile yield strength of 410 kg/cm$^2$, a flexural modulus of elasticity of 24300 kg/cm$^2$, and a Rockwell hardness of 116R.

The nucleating agent used in this example was "7B5697N" masterbatch (containing D-sorbitol, manufactured by Dainichiseika Color & Chemicals Mfg. Co., Ltd., 90 wt % of "J-105F" (base resin) and 10 wt % of "Millad 3988" manufactured by Milliken & Company). As the metal soap, "MC-2" (calcium stearate, manufactured by NOF Corporation) was used.

The hydrogenated derivative used in this example was "Hybrar 7311S" (manufactured by Kuraray Co., Ltd., hydrogenated polystyrene-vinyl polyisoprene-polystyrene block copolymer, styrene content: 12 wt %).

The components were melted and mixed by using a 16 mm segment type two-axis extruder (manufactured by Kawabe Seisakusho Co., Ltd.) at a screw rotational speed of 250 rpm and a cylinder temperature of 200° C. to prepare a pellet composition.

The pellet composition was molded in a plate shape by using an injection molding machine ("KM180" manufactured by Kawaguchi, Ltd.) at a cylinder temperature of 220° C.

A molded product with a thickness of 1.0 mm was obtained.

The haze value of each plate-shaped injection molded product was measured at a temperature of 20° C. by using a direct-reading haze computer (manufactured by Suga Test Instruments Co., Ltd.).

Figure 8:
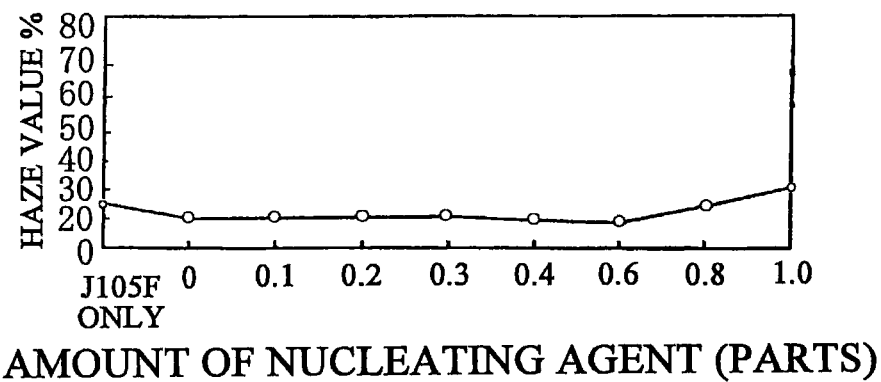
FIG. 8 shows testing conditions and results of Example 3.

The results are shown in the diagram of FIG. 8.

As is clear from the results shown in FIG. 8, when the amount of the nucleating agent was 0.6 parts by weight or less for 100 parts by weight of the homo-PP as the base resin, the haze value of the molded product with a thickness of 1.0 mm was decreased to some extent. On the other hand, the haze value was increased when the amount of the nucleating agent was greater than 0.6 parts by weight.

Therefore, in order not to impair the transparency improvement effect on the PP molded product by the addition of the hydrogenated derivative, it is preferable to add the nucleating agent in an amount of 0.6 part by weight or less for 100 parts by weight of the homo-PP as the base resin.

Example 4

Effect of Addition of Nucleating Agent to Resin Composition Containing Random-PP as Base Resin In Example 4 of the invention, a nucleating agent was added to a polypropylene random copolymer as a base resin in different amounts to prepare resin compositions. The resin compositions were then pelletized. A microwell array chip with a thickness of 1.0 mm was obtained by using each pellet composition, and the haze value of each molded product was measured as transparency evaluation.

The nucleating agent was added to the resin composition containing 50 parts by weight of the hydrogenated derivative and 0.3 parts by weight of metal soap for 100 parts by weight of the random-PP in the range of 0 to 0.6 parts by weight.

In this example, "J-3021GR" (manufactured by Idemitsu Petrochemical Co., Ltd.) was used as the random copolymer.

This random-PP has an MFR of 33 g/10 min, a density of 0.9 g/cm$^3$, a Young's modulus of 1000 MPa, a flexural modulus of elasticity of 1000 MPa, and a Rockwell hardness of 76R.

The components used in this example were the same as the materials used in Example 3 excluding the random PP as the base resin. The pellet composition and the injection molded product were prepared in the same manner as in Example 3, and the haze value was measured according to the method used in Example 3. The haze value measurement results are shown in FIG. 9.

Figure 9:
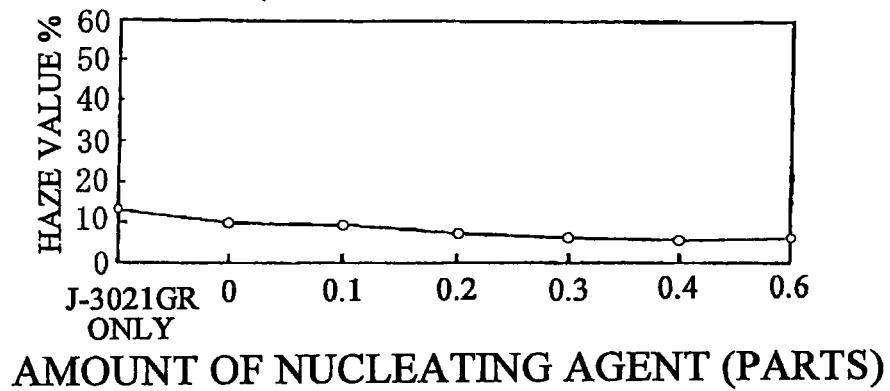
FIG. 9 shows testing conditions and results of Example 4.

As is clear from the results shown in FIG. 9, the haze value of the microwell array chip with a thickness of 1.0 mm was decreased as the amount of the nucleating agent was increased. Therefore, it was found that the addition of the nucleating agent exhibits a transparency providing effect on the microwell array chip when using the homo-PP as the base resin.

However, when the nucleating agent was added in an amount of 0.6 parts by weight for 100 parts by weight of the random-PP as the base resin, an increase in the haze value of the molded product was observed. Therefore, when producing a resin composition using the random-PP as the base resin, it is preferable to add the nucleating agent in an amount of 0.6 parts by weight or less.

Example 5

Microwell Position Detection Plate

In Example 5, a microwell position detection plate was prepared, in which the back surface of a microwell array chip 1 having dimensions of 20 mm×20.32 mm×1 mm (thickness) and including a well region 3 having dimensions of 13.93× 4.63 mm at the center was bonded to the front surface of a glass plate 2 having dimensions of 75 mm×25 mm×1 mm using cyanoacrylate.

Figure 7:
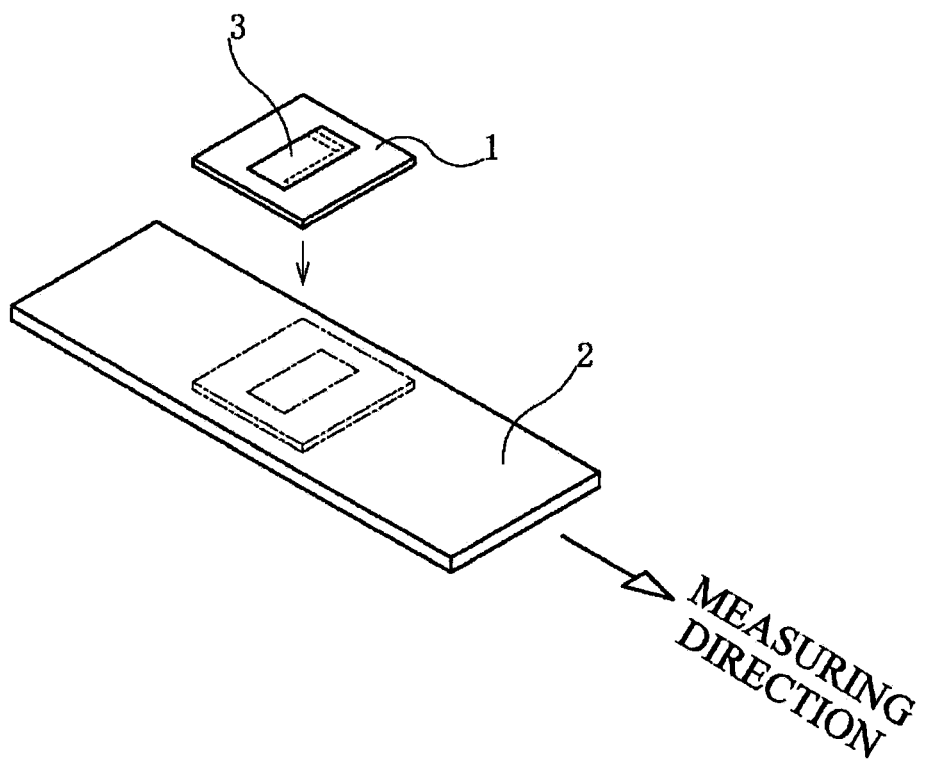
FIG. 7 is an exploded oblique diagram of a microwell position detection plate.

The microwell array chip 1 shown in FIG. 7 is the test number 23, in which the hydrogenated derivative was added to the random-PP in an amount of 50 wt %.

The minute protrusion/recess pattern (shape in which wells and partition walls between the wells are regularly arranged in the vertical and horizontal directions) of the well region was formed by arranging 30 clusters in the longitudinal direction of the well region and arranging 10 clusters in the lateral direction, each cluster including 30×30 wells with a diameter of 10 μm arranged at a pitch of 15 μm. The total number of wells was about 250,000.

A polypropylene injection molded product is not generally bonded by using cyanoacrylate or another adhesive. However, since the chip of the test number 23 contains the hydrogenated derivative (particularly polystyrene), the injection molded product of this example can be bonded to the glass plate using an adhesive.

A cell such as a lymphocyte or a biological tissue is placed in the well of the microwell array chip. The microwell array chip is moved in an optical reading machine in the direction indicated by the arrow shown in FIG. 7, and the position of the biological reaction expression factor is read.

Example 6

Micro Resin Pipette Tip

Figure 10:
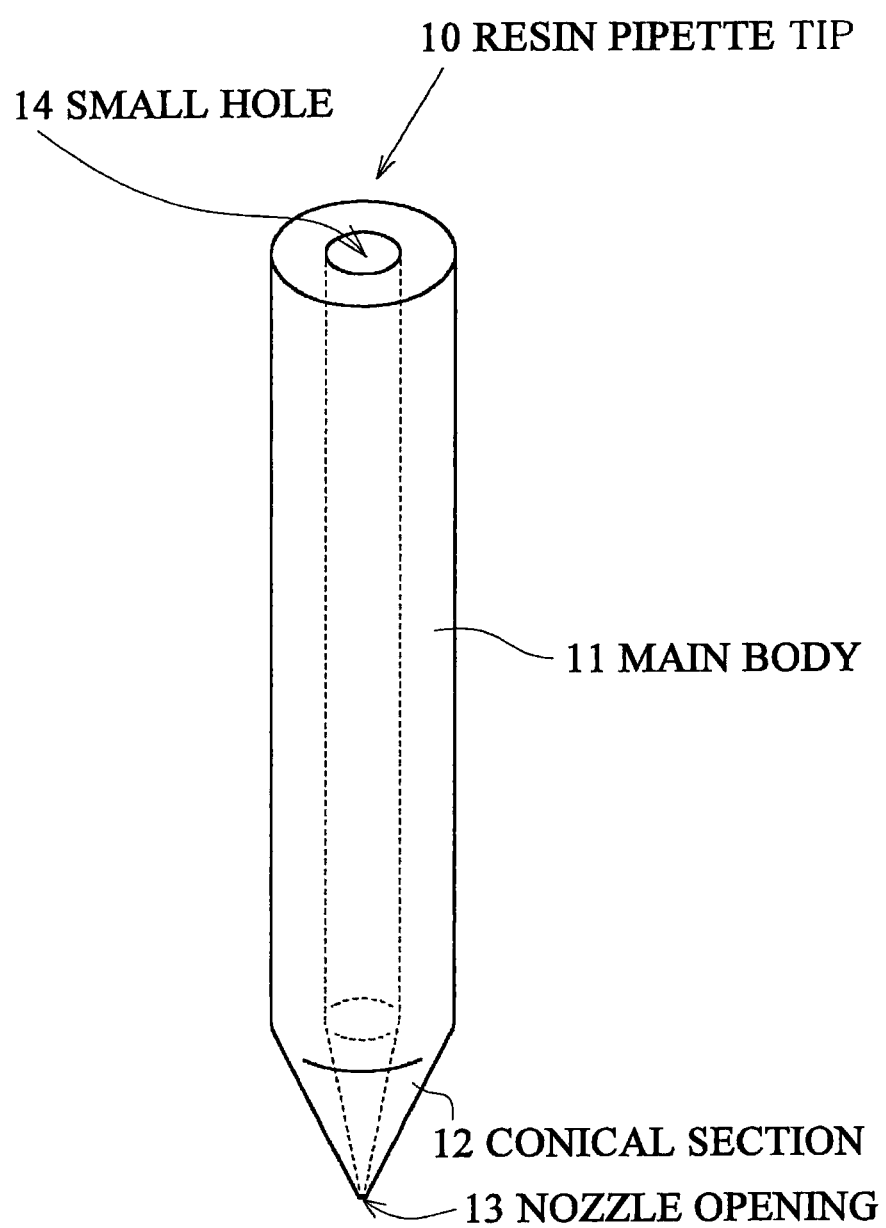
FIG. 10 shows an example of a micro resin pipette tip according to the invention.

A micro resin pipette tip 10 shown in FIG. 10 is installed in a capillary holder (not shown) or the like, and used to sample or dispense a biological substance, an organic substance, or an inorganic substance.

In the micro resin pipette tip, the end of a main body 11 installed in the holder forms a conical section 12 in a reverse conical shape.

The main body 11 is in the shape of a pipe, and has a hole 14 which communicates with a nozzle opening 13 at the end.

Figure 11:
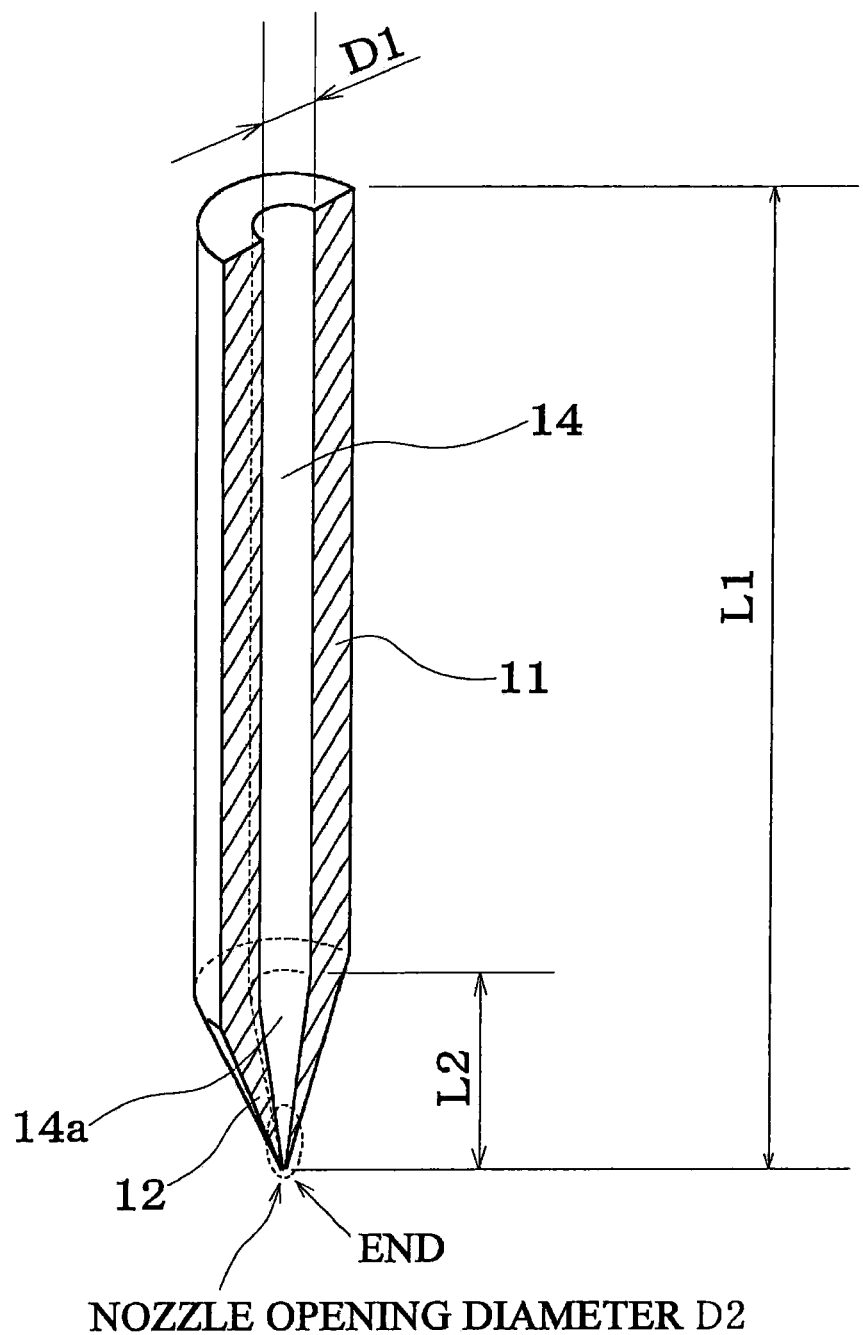
FIG. 11 is a cross-sectional diagram of a micro resin pipette tip.
Figure 12:
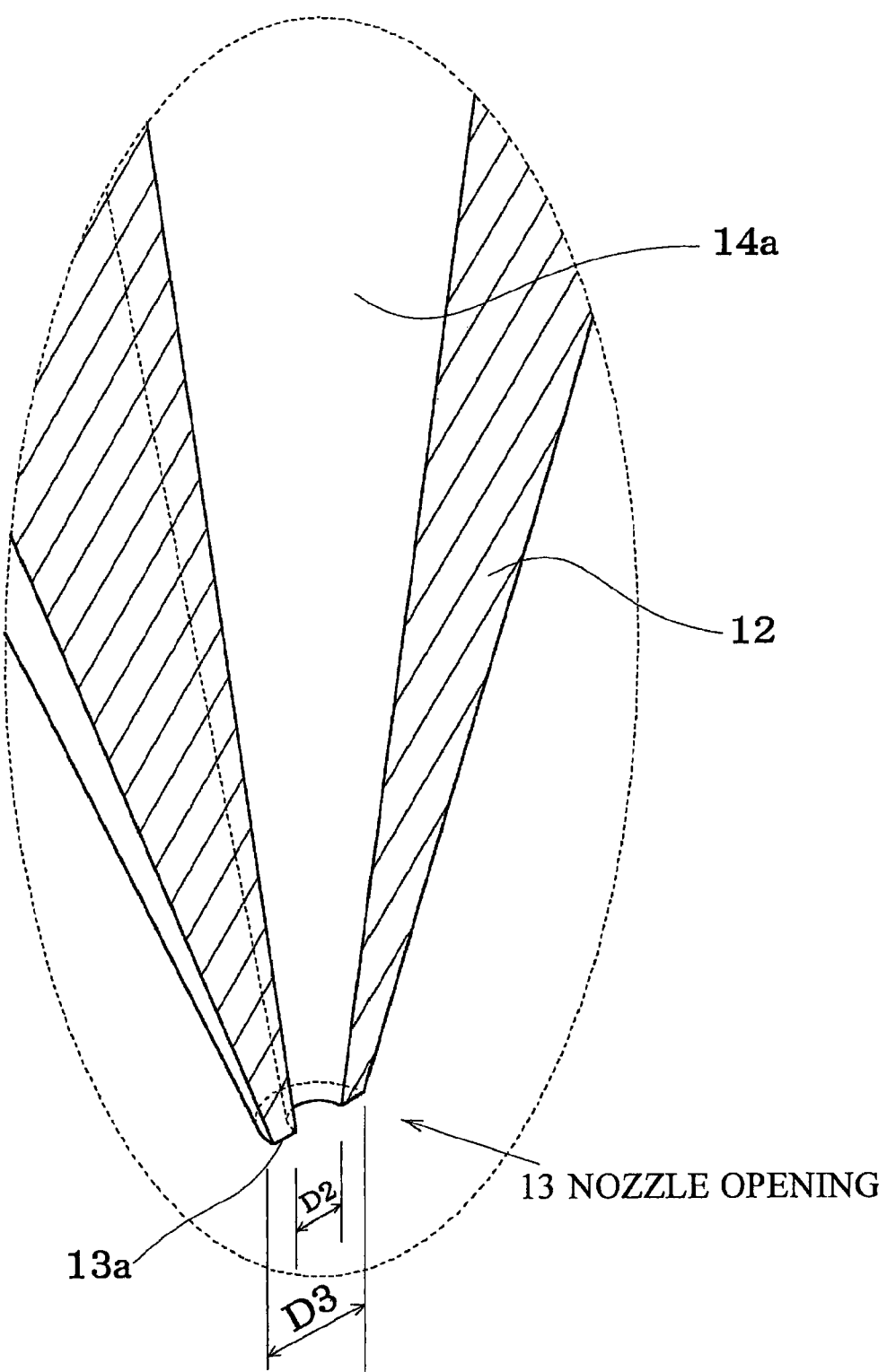
FIG. 12 is an enlarged cross-sectional diagram of a nozzle end.

FIG. 11 is a cross-sectional diagram of the micro resin pipette tip, and FIG. 12 is an enlarged diagram of the end of the micro resin pipette tip.

The end of the pipette tip forms the conical section 12 in which a small hole 14a is formed.

The small hole 14a is gradually reduced in diameter toward the open end. The diameter D2 of the open end is selected according to the size of the target substance.

The example shown in FIGS. 10 to 12 is an example in which the target substance is a lymphocyte. The outer diameter of the main body 11 is 3 mm, the total length L1 is about 15 mm, the length L2 of the conical section 12 is about 3 mm, the diameter D1 of the hole 14 is 1 mm, the diameter D2 of the hole 14 is 10 to 15 μm, and the diameter D3 of the hole 14 is 30 to 35 μm.

In the invention, a section used to directly sample or dispense the target substance is the small hole 14a in the conical section. The volume of the small hole 14a is defined as the volume of the pipette tip.

The volume may be set in the range of several tens of pocoliters to several tens of nanoliters. In this example, the volume is about 10 nanoliters.

An injection molding example is described below.

Figure 13:
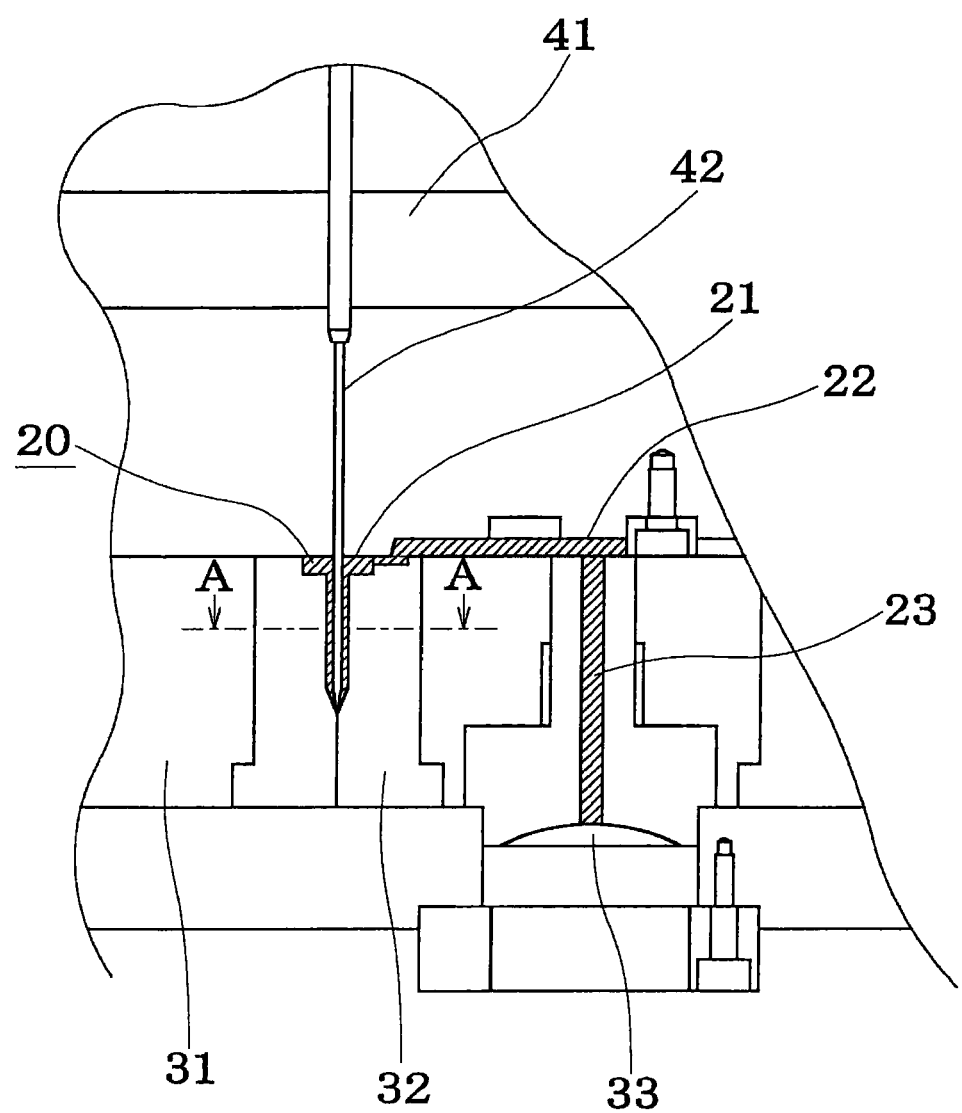
FIG. 13 shows a mold structure example for injection molding a micro resin pipette tip.

FIG. 13 shows a mold structure example. The shaded section indicates a resin filling section.

The shaded section indicates a runner section 22 and a sprue section 23 for a base material 20.

An insert mold 32 having a cavity shape of the base material 20 of the micro resin pipette tip 10 is attached to a cavity mold 31.

Figure 14:
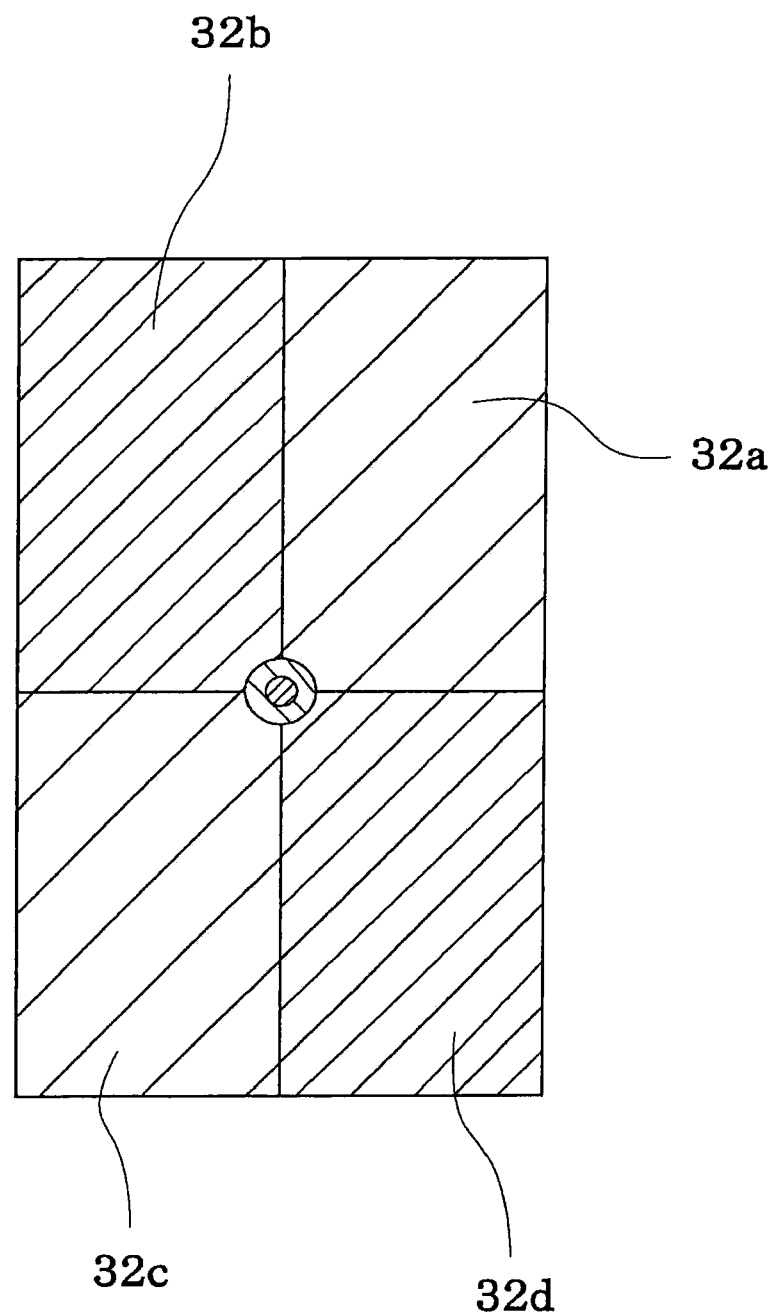
FIG. 14 is a cross-sectional diagram of an insert mold along the line A-A.
Figure 15:
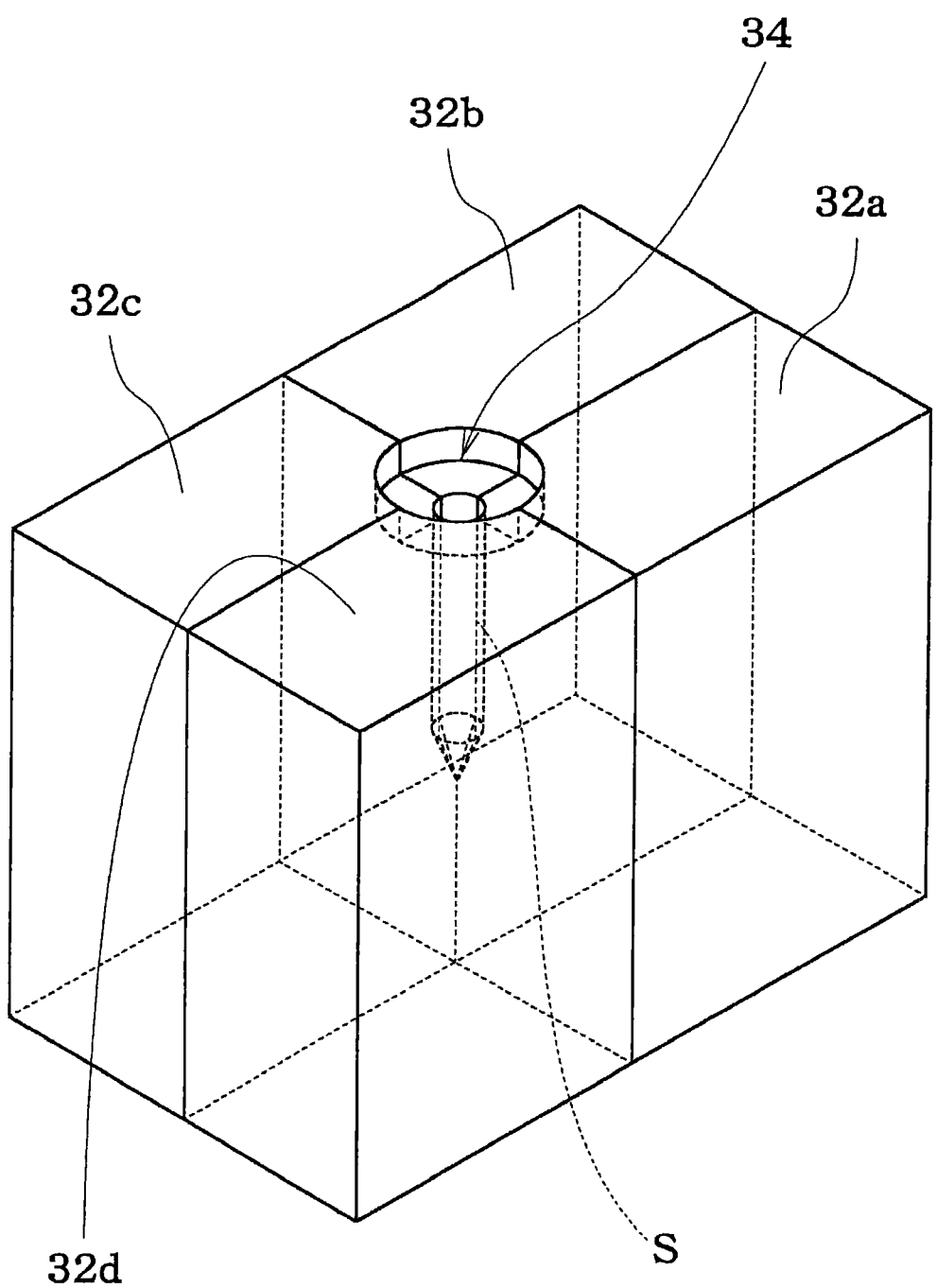
FIG. 15 is an oblique diagram of a cavity.
Figure 16:
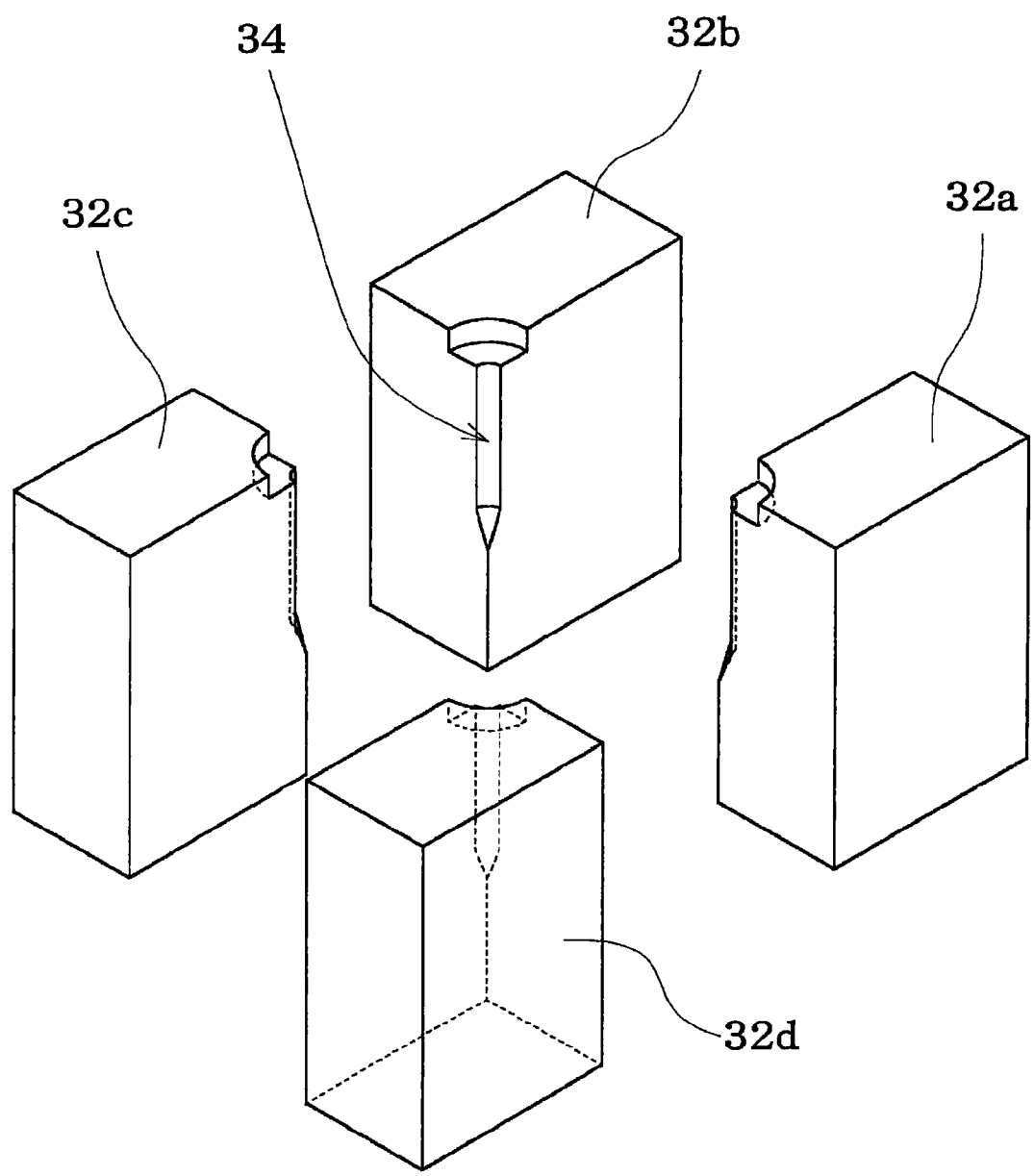
FIG. 16 shows a divided structure of an insert mold.

FIG. 14 is a cross-sectional diagram of the insert mold 32 along the line A-A. FIG. 15 is an oblique diagram of the insert mold 32. FIG. 16 is an exploded diagram of the insert mold 32. As shown in FIGS. 14 to 16, the insert mold 32 is divided into four segments 32a, 32b, 32c, and 32d. In FIG. 15, the dividing line is indicated by S.

If the insert mold 32 is divided into four segments, the shape of a section corresponding to the conical section 12, particularly the nozzle opening side wall 13a can be precisely formed when electric discharge machining the shape of a cavity section 34.

As shown in FIG. 13, a core pin 42 for forming the small hole 14a is removably provided to a movable mold 41.

A pushing pin for removing a product and the like are omitted.

Figure 17:
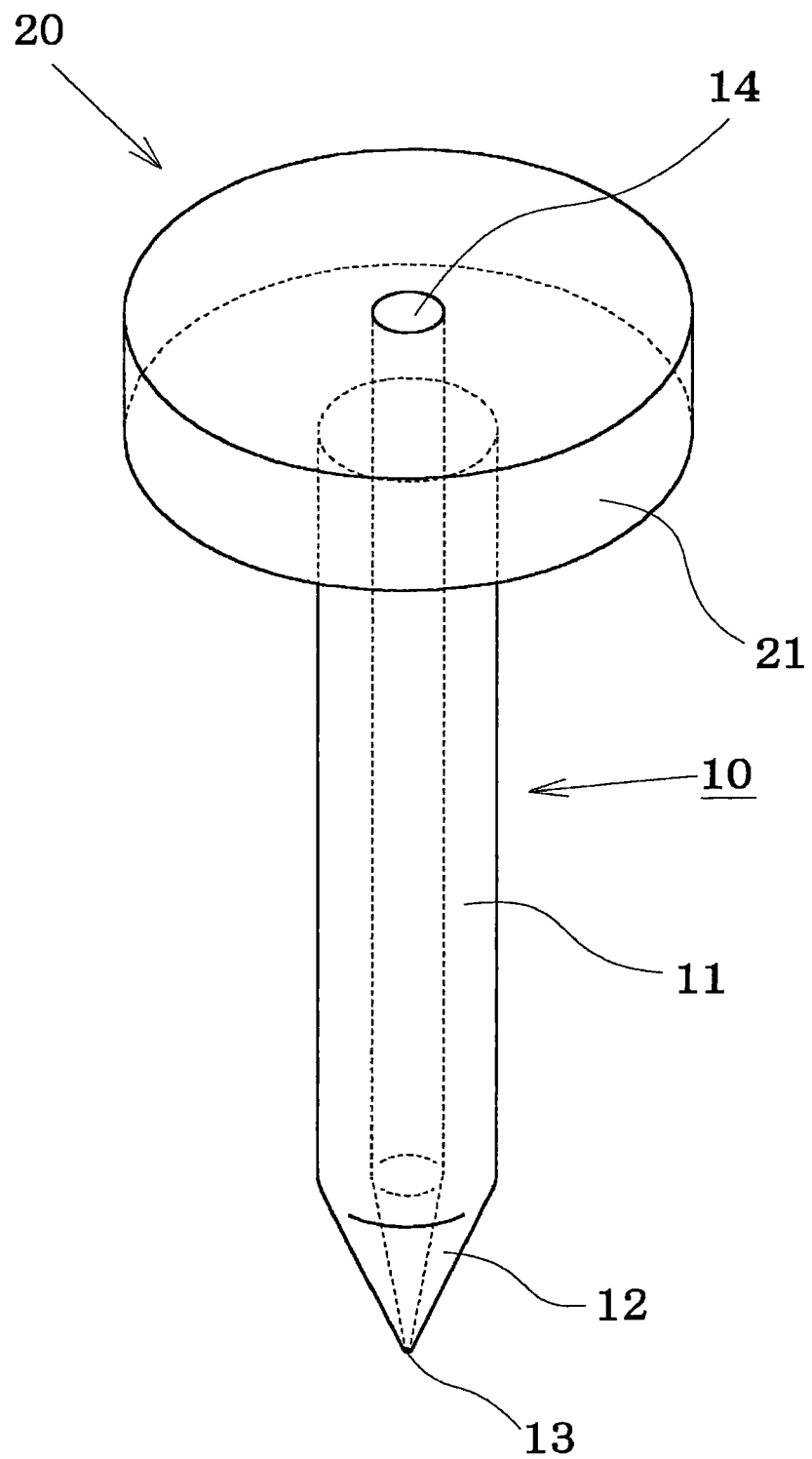
FIG. 17 shows an example of an injection molded base material.

The base material 20 as shown in FIG. 17 is obtained by using such a mold.

In the base material, a flange section 21 was formed to ensure moldability of the pipette tip 10. The flange section 21 was cut from the base material to form a product.

As the polypropylene-based resin, a homo-PP (homopolypropylene in FIG. 18; "J-105F" manufactured by Mitsui Sumitomo Polyolefin Co., Ltd.) and a random-PP (random copolymer in FIG. 18; "J-3021GR" for injection molding manufactured by Idemitsu Petrochemical Co., Ltd., MFR: 33 g/10 min, density: 0.9 g/cm$^3$, Young's modulus: 1000 MPa, flexural modulus of elasticity: 1000 MPa, Rockwell hardness: 76R) were used. As the hydrogenated derivative, "Hybrar 7311S" (manufactured by Kuraray Co., Ltd., hydrogenated polystyrene-vinyl polyisoprene-polystyrene block copolymer, styrene content: 12 wt %) was used. A pipette tip with a flange shown in FIGS. 10 to 12 was continuously injection molded at an injection pressure of 15 MPa while changing the amount of each component. The evaluation results are shown in FIG. 18.

The injection pressure is the molten resin injection pressure measured by using a gauge. In the related-art technology, an injection pressure of 200 MPa or more is necessary. However, it was confirmed that the product can be injection molded at an injection pressure of 20 to 30 MPa or less.

In the injection molding evaluation shown in FIG. 18, "AA" indicates excellent transfer properties and moldability (releasability), "A" indicates excellent mold transfer properties acceptable for the product, "B" indicates that a transfer failure partially occurs in the product shape, and "C" indicates a level unacceptable as the product.

The evaluation results suggest that the hydrogenated derivative must be added in an amount of 5% or more. On the other hand, when the amount of the hydrogenated derivative exceeded 70%, the shape stability was decreased.

Since the resin composition according to the invention includes a hydrogenated derivative having a specific composition in addition to the polypropylene-based resin, the micromachined features of the stamper or the mold shape can be precisely transferred under injection conditions equal to or less stringent than the usual polypropylene-based resin injection conditions. Therefore, the resin composition according to the invention may be applied to a microproduct in the fields of chemistry, biochemistry, biotechnology, and biology, such as a micromechanical switching element, a microoptical product, a microfluid, a microchemical reactor functional element, a capillary model of a blood fluidity measuring device, a microbioreactor, a microwell array chip, a microinjector, or a micro resin pipette tip.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method of producing a microproduct comprising:
providing a resin composition including 30 to 90 wt % of a polypropylene-based resin and 10 to 70 wt % of a hydrogenated derivative of a block copolymer shown by the general formula "X-Y" (X represents a polymer block immiscible with the polypropylene-based resin, and Y represents an elastomeric polymer block of a conjugated diene that is miscible with the polypropylene-based resin after hydrogenation);
attaching a silicon stamper to a mold cavity of an injection molding machine, the silicon stamper having micromachined features formed by etching the surface of a silicon plate; and
precisely transferring the micromachined features of the silicon stamper to the resin composition by injecting the resin composition into the mold cavity,
a molded surface formed using the resin composition having a plurality of recesses and/or protrusions, a depth of each recess or a height of each protrusion being 0.3 to 200 μm, and a width of an opening of each recess, a width of each protrusion, or a circumscribed or inscribed circle diameter of each recess or each protrusion being 0.3 to 100 μm.

2. The method as defined in claim 1,
wherein the polymer block X of the hydrogenated derivative of the resin composition is polystyrene, and the polymer block Y before hydrogenation is polyisoprene having a 1,2-bond, a 3,4-bond, and a 1,4-bond, or polyisoprene having a 1,4-bond.

3. The method of producing the microproduct as defined in claim 1,
wherein the polymer block X of the hydrogenated derivative of the resin composition is polystyrene, and the polymer block Y before hydrogenation is polybutadiene having at least one of a 1,2-bond and a 1,4-bond.

4. The method of producing the microproduct as defined in claim 1,
wherein the resin composition includes a nucleating agent for the polypropylene-based resin.

* * * * *